(12) United States Patent
Cheng et al.

(10) Patent No.: US 12,299,911 B2
(45) Date of Patent: May 13, 2025

(54) IMAGE PROCESSING METHOD AND APPARATUS, AND STORAGE MEDIUM

(71) Applicants: HUAWEI TECHNOLOGIES CO., LTD., Shenzhen (CN); University of Science and Technology of China, Hefei (CN)

(72) Inventors: Jie Cheng, Shenzhen (CN); Lei Jiang, Hangzhou (CN); Yang Cao, Hefei (CN); Zhengjun Zha, Hefei (CN)

(73) Assignees: Huawei Technologies Co., Ltd, Shenzhen (CN); University of Science and Technology of China, Hefei (CN)

( * ) Notice: Subject to any disclaimer, the term of this patent is extended or adjusted under 35 U.S.C. 154(b) by 341 days.

(21) Appl. No.: 18/064,144

(22) Filed: Dec. 9, 2022

(65) Prior Publication Data

US 2023/0109317 A1    Apr. 6, 2023

Related U.S. Application Data

(63) Continuation of application No. PCT/CN2021/099560, filed on Jun. 11, 2021.

(30) Foreign Application Priority Data

Jun. 12, 2020 (CN) .......................... 202010537872.7

(51) Int. Cl.
*G06T 7/10* (2017.01)
*G06T 7/40* (2017.01)
(Continued)

(52) U.S. Cl.
CPC .................. *G06T 7/40* (2013.01); *G06T 7/10* (2017.01); *G06V 10/44* (2022.01); *G06V 10/771* (2022.01);
(Continued)

(58) Field of Classification Search
None
See application file for complete search history.

(56) References Cited

U.S. PATENT DOCUMENTS

2021/0166347 A1* 6/2021 Arani ........................ G06T 7/11

OTHER PUBLICATIONS

Nanqixiaoseng, "Fine-Grained Identification|Baidu Fine-Grained Recognition Scheme," [online], https://blog.csdn.net/qq_25439417/article/details/82764183, total 9 pages (Sep. 18, 2018).

(Continued)

*Primary Examiner* — Idowu O Osifade
(74) *Attorney, Agent, or Firm* — Leydig, Voit & Mayer, Ltd.

(57) ABSTRACT

An image processing method and apparatus, and a storage medium are provided, and relate to the image processing field. A dependency relationship between features of texture primitives of an image may be obtained based on direction information and a multi-scale feature map of the image, at least one group of texture features of the image may be obtained based on a feature map of the image on at least one scale, and a texture representation result of the image may be obtained based on the dependency relationship and the at least one group of texture features. Then, the image may be processed based on the texture representation result of the image. Because the texture representation result of the image can reflect more perfect texture information of the image, an image processing effect is better when image processing such as image recognition, image segmentation, or image synthesis is performed.

20 Claims, 8 Drawing Sheets

(51) Int. Cl.
*G06V 10/44* (2022.01)
*G06V 10/771* (2022.01)
*G06V 10/82* (2022.01)

(52) U.S. Cl.
CPC .... *G06V 10/82* (2022.01); *G06T 2207/20016* (2013.01)

(56) References Cited

OTHER PUBLICATIONS

Jixian et al., "Energy Representation Based Multiscale Approach to Image Texture," Proceedings of Third International Conference on Signal Processing (ICSP'96), Beijing, China, DOI: 10.1109/ICSIGP. 1996.566325, pp. 1146-1150, Institute of Electrical and Electronics Engineers, New York, New York (Oct. 14-18, 1996).

"Semantic Segmentation Methods," [online], https://blog.csdn.net/weixin_40446557/article/details/85624579, total 11 pages (Jan. 2, 2019).

"Texture Synthesis," [online], Baidu Encyclopedia, https://baike.baidu.com/item/%E7%BA%B9%E7%90%86%E5%90%88%E6%88%90/7366477?fr=aladdin, total 2 pages (May 20, 2024).

\* cited by examiner

IMAGE PROCESSING METHOD AND APPARATUS, AND STORAGE MEDIUM

CROSS-REFERENCE TO RELATED APPLICATIONS

This application is a continuation of International Application No. PCT/CN2021/099560, filed on Jun. 11, 2021, which claims priority to Chinese Patent Application No. 202010537872.7, filed on Jun. 12, 2020. The disclosures of the aforementioned applications are hereby incorporated by reference in their entireties.

TECHNICAL FIELD

Embodiments of this application relate to the image processing field, and in particular, to an image processing method and apparatus, and a storage medium.

BACKGROUND

A texture representation is an important research field in computer vision, and has a wide application prospect in image processing fields such as image recognition, image segmentation, and image synthesis. For example, in image recognition, the texture representation may be first performed on a to-be-recognized image, and then the to-be-recognized image may be recognized based on a texture representation result of the to-be-recognized image. For example, a person, a building, or the like in the to-be-recognized image may be recognized.

However, in the conventional technology, when an image is processed based on a texture representation result of the image, an effect is poor. For example, when the to-be-recognized image is recognized, recognition accuracy is low.

SUMMARY

Embodiments of this application provide an image processing method and apparatus, and a storage medium, to improve an image processing effect, for example, to improve image recognition accuracy.

According to a first aspect, an embodiment of this application provides an image processing method. The method may be implemented by using a neural network. The method includes: obtaining a dependency relationship between features of texture primitives of an image based on direction information and a multi-scale feature map of the image, where the multi-scale feature map includes features of a plurality of texture primitives of the image on a plurality of different scales, and the direction information includes one or more directions; obtaining at least one group of texture features of the image based on a feature map of the image on at least one scale, where the group of texture features of the image is obtained based on the feature map on one scale; obtaining a texture representation result of the image based on the dependency relationship and the at least one group of texture features; and processing the image based on the texture representation result of the image.

In the image processing method, the texture representation result of the image can reflect more perfect texture information of the image because the texture representation result of the image may include both the texture feature of the image and a dependency relationship between features of different texture primitives of the image. Therefore, an image processing effect is better when image processing such as image recognition, image segmentation, or image synthesis is subsequently performed based on the texture representation result of the image. For example, image recognition accuracy can be effectively improved.

In an embodiment, the direction information includes a first direction and a second direction opposite to the first direction.

For example, the direction information may include a plurality of groups of directions, each group of directions may include two opposite directions: the first direction and the second direction. In other words, the directions included in the direction information may be an even quantity of directions that exist in pairs.

In this embodiment, when the direction information includes the even quantity of directions that exist in pairs, the dependency relationship between the features of the texture primitives of the image may be obtained more fully.

In an embodiment, the obtaining at least one group of texture features of the image based on a feature map of the image on at least one scale includes: extracting a feature of each texture primitive in the feature map of the image on the at least one scale, to obtain the features of the plurality of texture primitives; and pooling the features of the plurality of texture primitives, to obtain the at least one group of texture features.

In this embodiment, the feature of each texture primitive in the feature map of the image on the at least one scale is extracted, to obtain spatially ordered texture features of the image.

In an embodiment, the obtaining a dependency relationship between features of texture primitives of an image based on direction information and a multi-scale feature map of the image includes: extracting a feature of each texture primitive in the multi-scale feature map of the image based on the direction information, to obtain features of texture primitives in a plurality of regions of the image; obtaining a dependency relationship between features of texture primitives in each region based on the features of the texture primitives in the plurality of regions, to obtain a plurality of groups of dependency relationships respectively corresponding to the plurality of regions; and determining the dependency relationship between the features of the texture primitives of the image based on the plurality of groups of dependency relationships.

For example, the feature of each texture primitive in the multi-scale feature map of the image may be extracted based on the direction information, to obtain a plurality of first matrices. One first matrix includes a feature of a texture primitive in one region of the image. Then, a corresponding second matrix may be determined based on each first matrix, to obtain a plurality of second matrices. The second matrix may include a dependency relationship between features of texture primitives in a region of an image corresponding to the corresponding first matrix, to obtain the plurality of groups of dependency relationships respectively corresponding to the plurality of regions. The plurality of groups of dependency relationships are aggregated, to obtain the dependency relationship between the features of the texture primitives of the image.

In an embodiment, before the determining the dependency relationship between the features of the texture primitives of the image based on the plurality of groups of dependency relationships, the method further includes: updating a bidirectional relationship value between features of any two texture primitives in each of the plurality of groups of dependency relationships based on a first function.

In this embodiment, the bidirectional relationship value between the features of the any two texture primitives in each group of dependency relationships is updated, to strengthen each group of dependency relationships, and establish a correlation between the features of the any two texture primitives in each group of dependency relationships, so that the neural network learns of spatial structure dependency between the texture primitives more easily.

In an embodiment, the extracting a feature of each texture primitive in the multi-scale feature map of the image based on the direction information includes: extracting the feature of each texture primitive in the multi-scale feature map of the image along the one or more directions.

For example, one or more directional maps may be used as a spatial context guidance condition, and the feature of each texture primitive in the multi-scale feature map of the image is extracted along a direction corresponding to the directional map, to effectively improve a capability of extracting a spatial context cue, and further sense the feature of the texture primitive better, so as to extract as many features of potential texture primitives in the multi-scale feature map as possible, and obtain a more comprehensive dependency relationship between the features of the texture primitives of the image.

Optionally, before the obtaining a dependency relationship between features of texture primitives of an image based on direction information and a multi-scale feature map of the image, the image processing method further includes: extracting feature maps of the image on a plurality of scales; and scaling the feature maps of the image on the plurality of scales to a same scale size for splicing, to obtain the multi-scale feature map of the image.

In an embodiment, before the extracting feature maps of the image on a plurality of scales, the image processing method may further include: adjusting a size of an original image to a first size through bilateral linear interpolation.

In an embodiment, after the adjusting a size of an original image to a first size through bilateral linear interpolation, the image processing method may further include: cropping, from the original image whose size is the first size, an image block whose size is a second size, and using the image block as a to-be-processed image.

In an embodiment, before the extracting feature maps of the image on a plurality of scales, the image processing method may further include: standardizing the image.

The image is standardized, to centralize feature data of each texture primitive of the image, and increase a generalization capability of image processing.

In an embodiment, the processing the image includes any one of recognizing the image, segmenting the image, and performing image synthesis based on the image.

According to a second aspect, an embodiment of this application provides an image processing apparatus. The image processing apparatus may be implemented by using a neural network. The apparatus has a function of implementing the method in the first aspect. The function may be implemented by using hardware, or may be implemented by using hardware executing corresponding software. The hardware or software includes one or more modules corresponding to the function, for example, a texture representation module and a processing module.

The texture representation module may be configured to: obtain a dependency relationship between features of texture primitives of an image based on direction information and a multi-scale feature map of the image, where the multi-scale feature map includes features of a plurality of texture primitives of the image on a plurality of different scales, and the direction information includes one or more directions; obtain at least one group of texture features of the image based on a feature map of the image on at least one scale, where the group of texture features of the image is obtained based on the feature map on one scale; and obtain a texture representation result of the image based on the dependency relationship and the at least one group of texture features. The processing module may be configured to process the image based on the texture representation result of the image.

According to a third aspect, an embodiment of this application provides an image processing apparatus, including: an interface circuit, configured to receive data of a to-be-processed image; and a processor, connected to the interface circuit, and configured to perform the method in any one of the first aspect or the embodiments of the first aspect.

According to a fourth aspect, an embodiment of this application further provides an image processing apparatus, including: a processor, where the processor is configured to: be connected to a memory, and invoke a program stored in the memory, to perform the method in any one of the first aspect or the embodiments of the first aspect.

According to a fifth aspect, an embodiment of this application further provides a computer-readable storage medium, including computer software instructions. When the computer software instructions run in an image processing apparatus or a chip built into the image processing apparatus, the image processing apparatus is enabled to perform the method in any one of the first aspect or the embodiments of the first aspect.

According to a sixth aspect, an embodiment of this application further provides a computer program product. When the computer program product is executed, the method in any one of the first aspect or the embodiments of the first aspect may be implemented.

According to a seventh aspect, an embodiment of this application further provides a chip system. The chip system is applied to an image processing device. The chip system includes one or more interface circuits and one or more processors. The interface circuit and the processor are interconnected through a line. The processor receives computer instructions from a memory of an electronic device through the interface circuit, and executes the computer instructions, to implement the method in any one of the first aspect or the embodiments of the first aspect.

It can be understood that for beneficial effects that can be achieved in the second aspect to the seventh aspect, refer to beneficial effects in any one of the first aspect and the embodiments of the first aspect. Details are not described herein again.

DESCRIPTION OF EMBODIMENTS

Figure 1:
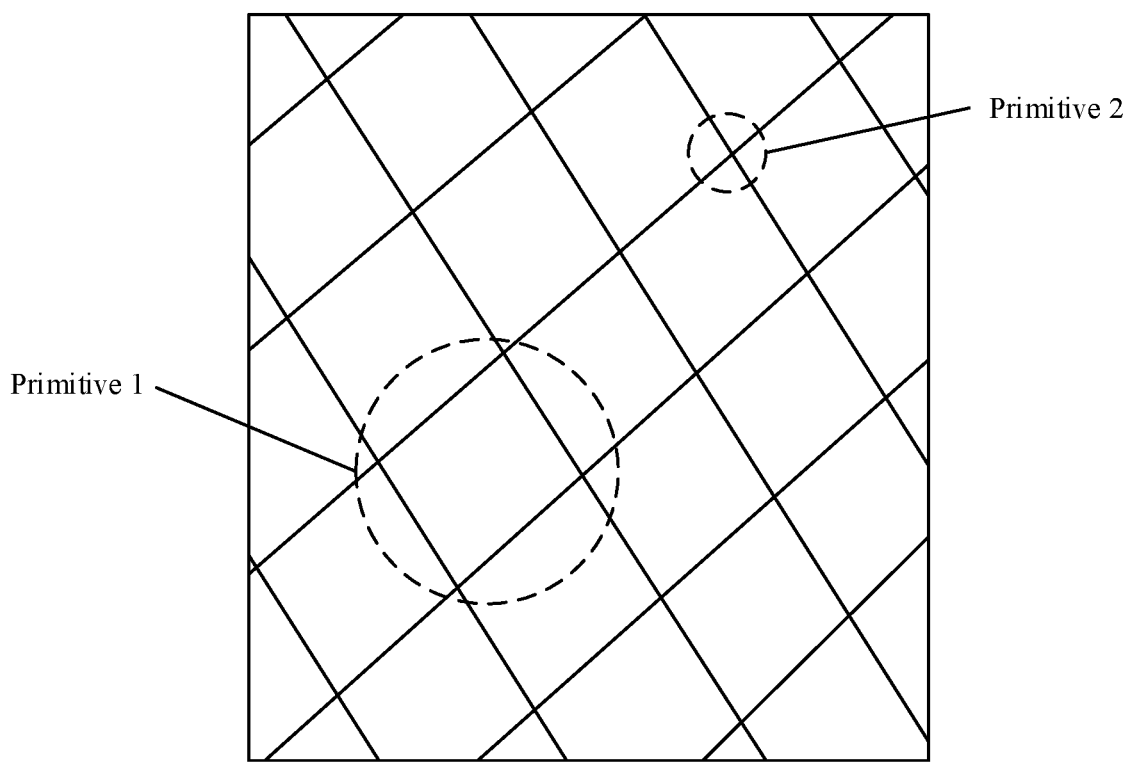
FIG. 1 is a schematic diagram of a waffle image.

An image texture is an important visual means, and is a ubiquitous feature in an image. For an image, the image texture usually includes a plurality of texture primitives, and the plurality of texture primitives may be of a same type or different types. For example, FIG. 1 is a schematic diagram of a waffle image. As shown in FIG. 1, for the waffle image, the texture primitive may be a quadrilateral lattice in the waffle image (a primitive 1 shown in FIG. 1) or an X-type texture in the waffle image (a primitive 2 shown in FIG. 1). In other words, the texture primitive of the waffle image may include two types: the primitive 1 and the primitive 2.

Certainly, it can be understood that the description of the texture primitive of the waffle images is merely an example description. In another image, another division manner may be used for the texture primitive. This is not limited herein in this application.

A feature of the texture primitive of the image is extracted, to implement image texture representation. An image processing operation such as image recognition, image segmentation, or image synthesis may be performed based on an image texture representation result. Therefore, image texture representation is widely applied to fields such as portrait detection, medical image analysis, industrial vision detection, image classification and retrieval.

For example, in image recognition, a person, a building, an animal, or the like that exist in a to-be-recognized image may be recognized based on a texture representation result of the to-be-recognized image. In image segmentation, a to-be-segmented image may be segmented into several specific regions with a unique property based on a texture representation result of the to-be-segmented image. In image synthesis, a plurality of different images may be synthesized into one image based on texture representation results of the plurality of different images. For example, a person in an image whose background is a desert may be embedded into an image whose background is a beach.

Figure 2:
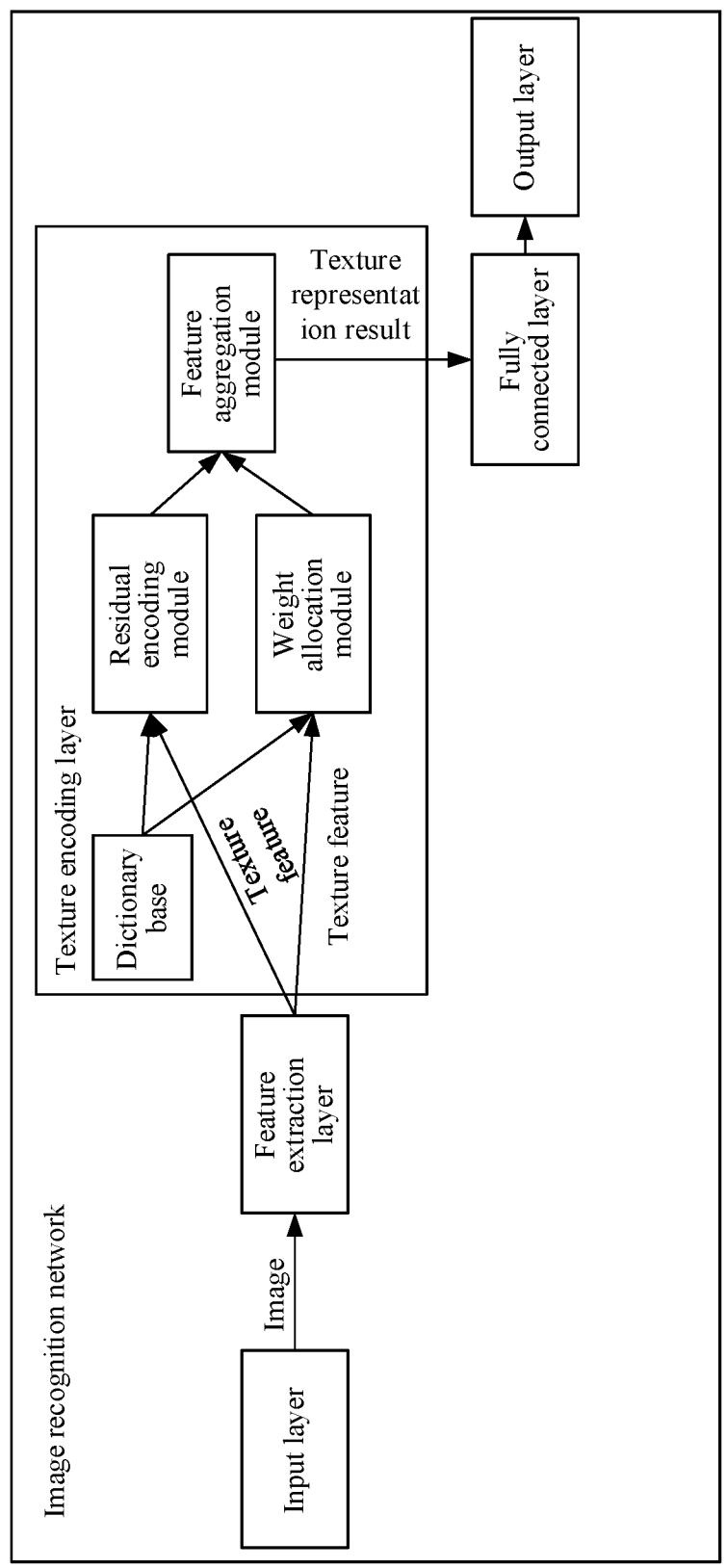
FIG. 2 is a schematic diagram of an existing image recognition network.

The following describes an existing image texture representation process by using image recognition as an example and with reference to FIG. 2.

FIG. 2 is a schematic diagram of an existing image recognition network. As shown in FIG. 2, the existing image recognition network may include an input layer, a feature extraction layer, a texture encoding layer, a fully connected layer, and an output layer. A dictionary base including a plurality of codewords is preset at the texture encoding layer, and further includes a residual encoding module, a weight allocation module, and a feature aggregation module.

A to-be-recognized image may be input into the image recognition network by using the input layer. The feature extraction layer may perform feature extraction on the image inputted by using the input layer, to obtain a feature of each texture primitive of the image. At the texture encoding layer, the residual encoding module may calculate, based on the feature that is of each texture primitive of the image and that is extracted by the feature extraction layer and a codeword in the dictionary base, a residual corresponding to the feature of each texture primitive of the image. The weight allocation module may calculate, based on the feature that is of each texture primitive of the image and that is extracted by the feature extraction layer and a codeword in the dictionary base, a weight corresponding to the feature of each texture primitive of the image. The feature aggregation module may aggregate the residual obtained by the residual encoding module and the weight obtained by the weight allocation module, to obtain a texture representation result of the image. The fully connected layer may recognize the image based on the texture representation result that is of the image and that is obtained by the texture encoding layer, for example, may perform portrait recognition, material detection, and article classification based on the texture representation result of the image.

However, in the image recognition network shown in FIG. 2, the texture encoding layer merely aggregates the feature of each texture primitive of the image in an out-of-order manner, to obtain the texture representation result of the image, and the obtained texture representation result of the image can reflect limited texture information of the image. Therefore, an image processing effect is poor when image processing such as image recognition, image segmentation, or image synthesis is subsequently performed based on the texture representation result of the image. For example, image recognition accuracy is low.

An embodiment of this application provides an image processing method. The method may be implemented by using a neural network. In the method, at least one group of texture features of an image may be obtained based on a feature map of the image on at least one scale, a dependency relationship between features of texture primitives of the image may be obtained based on direction information and a multi-scale feature map of the image, and a texture representation result of the image may be obtained based on the dependency relationship and the at least one group of texture features. Then, the image may be processed based on the texture representation result of the image.

That the image is processed may be any one of recognizing the image, segmenting the image, and performing image synthesis based on the image. This is not limited herein.

In the image processing method provided in this embodiment of this application, the texture representation result of the image is obtained based on the dependency relationship between the features of the texture primitives of the image and the at least one group of texture features of the image, so that the texture representation result of the image may include both the texture feature of the image and a dependency relationship between features of different texture primitives of the image, and the texture representation result of the image can reflect more perfect texture information of the image. Therefore, an image processing effect is better when image processing such as image recognition, image segmentation, or image synthesis is subsequently performed based on the texture representation result of the image. For example, image recognition accuracy can be effectively improved.

The following provides an example description of the image processing method provided in this embodiment of this application with reference to accompanying drawings.

It should be noted that in descriptions of this application, "at least one" means one or more, and "a plurality of" means two or more. The terms such as "first" and "second" are merely used to distinguish descriptions, and are not used to specifically limit a feature. The term "and/or" is used to describe an association relationship between associated objects, indicating that there are three types of relationships. For example, A and/or B may represent the following three cases: Only A exists, both A and B exist, and only B exists. The character "/" usually indicates an "or" relationship between associated objects.

In an example embodiment, this embodiment of this application provides an image processing device that may be configured to perform the image processing method. The image processing device may be an electronic device such as a desktop computer, a server, a television, a display, a mobile phone, a tablet computer, or a scanner. A specific type of the image processing device is not limited in this application.

Figure 3:
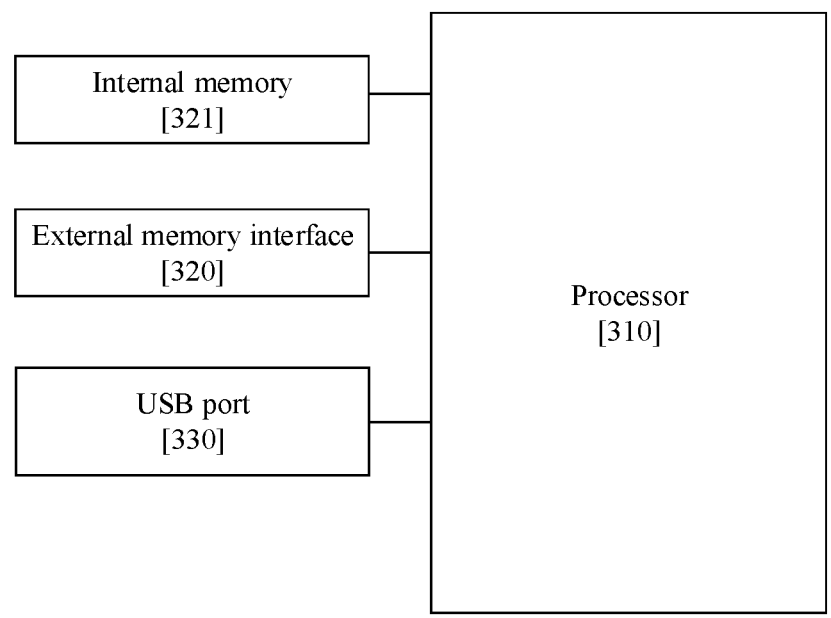
FIG. 3 is a schematic diagram of a composition of an image processing device according to an embodiment of this application.

FIG. 3 is a schematic diagram of a composition of an image processing device according to an embodiment of this application.

As shown in FIG. 3, the image processing device in this embodiment of this application may include a processor 310, an external memory interface 320, an internal memory 321, and a universal serial bus (USB) port 330.

The processor 310 may include one or more processing units. For example, the processor 310 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent devices, or may be integrated into one or more processors.

The controller may be a decision maker directing each component of the image processing device to coordinate work based on instructions. The controller is a nerve center and a command center of the image processing device. The controller may generate an operation control signal based on instruction operation code and a time sequence signal, to complete control of instruction reading and instruction execution.

The NPU is a neural-network (NN) computing processor. The NPU quickly processes input information with reference to a structure of a biological neural network, for example, a transfer mode between human brain neurons, and may further continuously perform self-learning. Applications such as intelligent cognition of the image processing device may be implemented by using the NPU, for example, image recognition, face recognition, speech recognition, and text understanding.

A memory may be further disposed in the processor 310, and is configured to store instructions and data. In some embodiments, the memory in the processor 310 is a cache memory, and may store instructions or data that is just used or recycled by the processor 310. If the processor 310 needs to use the instructions or the data again, the processor may directly invoke the instructions or the data from the memory. This avoids repeated access, reduces waiting time of the processor 310, and improves system efficiency.

In some embodiments, the processor 310 may include an interface. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general purpose input/output (GPIO) interface, an SIM interface, and/or a USB port, or the like.

The external memory interface 320 may be configured to be connected to an external memory card, for example, a Micro SD card, to extend a storage capability of the image processing device. The external storage card communicates with the processor 310 through the external memory interface 320, to implement a data storage function. For example, files such as music and a video are stored in the external storage card.

The internal memory 321 may be configured to store computer-executable program code. The executable program code includes instructions. The processor 310 runs the instructions stored in the internal memory 321, to execute various function applications and data processing of the image processing device. For example, the image processing method provided in this embodiment of this application may be performed. The internal memory 321 may include a program storage area and a data storage area. The program storage area may store an operating system, an application required by at least one function (for example, a sound playing function or an image playing function), and the like. The data storage area may store data created in a use process of the image processing device. In addition, the internal memory 321 may include a high-speed random access memory, and may further include a nonvolatile memory, for example, at least one magnetic disk storage device, a flash memory device, or a universal flash storage (UFS).

The USB port 330 may be a Mini USB port, a Micro USB port, a USB Type C port, or the like. The USB port 330 may be configured to be connected to a charger to charge the image processing device, or may be configured to transmit data between the image processing device and a peripheral device. For example, a to-be-processed image may be transmitted to the processor 310.

A structure illustrated in this embodiment of the present invention does not constitute a limitation on the image processing device. The image processing device may include more or fewer components than those shown in the figure, or combine some components, or split some components, or have different component arrangements. The components shown in the figure may be implemented by using hardware, software, or a combination of software and hardware.

For example, in some embodiments, the image processing device may further include a charging management module, a power management module, a battery, an antenna, a radio frequency module, a communications module, an audio module, a speaker, a telephone receiver, a microphone, a headset jack, a sensor, a button, an indicator, a camera, and a display, a subscriber identity module (SIM) card interface, or the like. Details are not described one by one.

Figure 4:
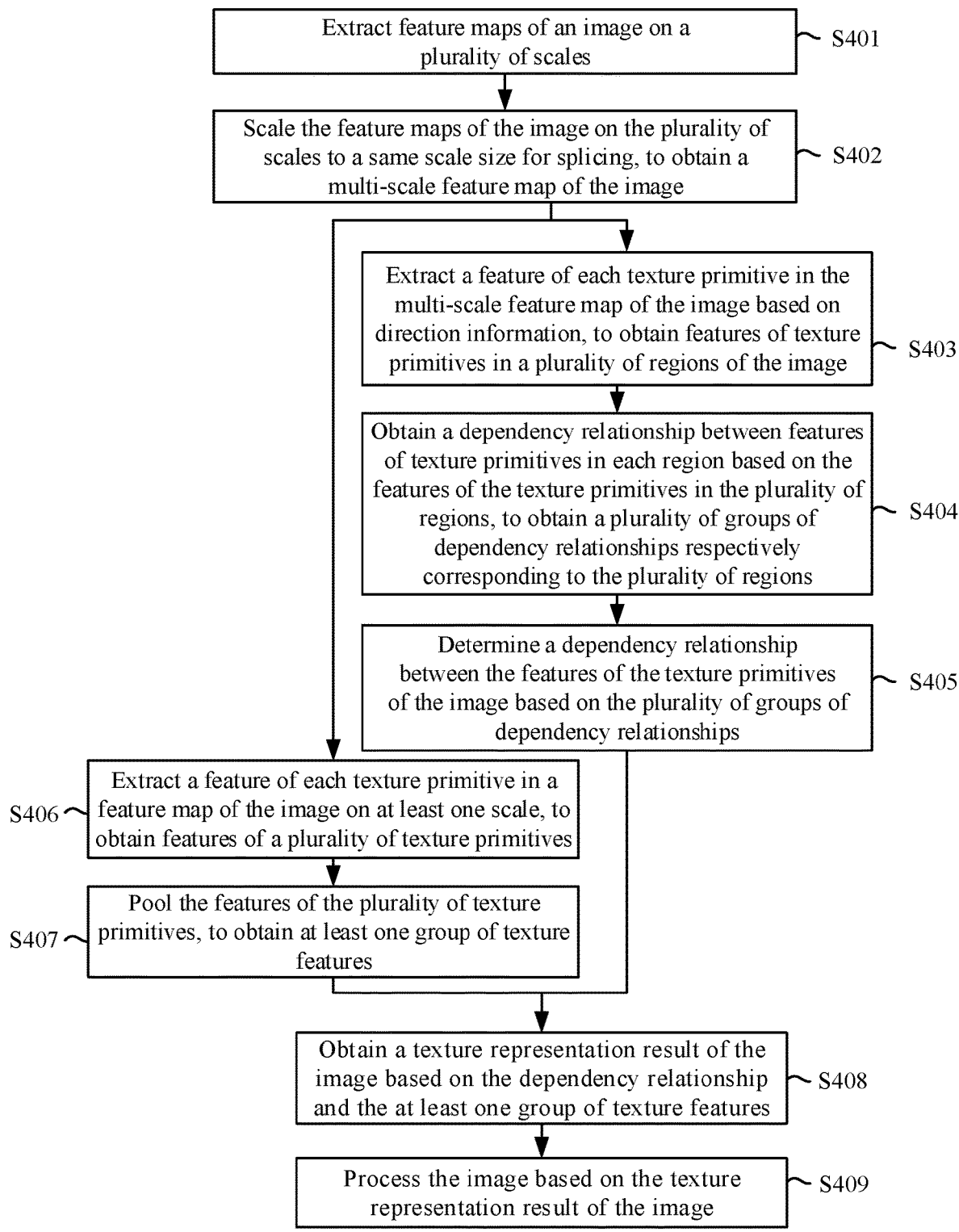
FIG. 4 is a schematic flowchart of an image processing method according to an embodiment of this application.

FIG. 4 is a schematic flowchart of an image processing method according to an embodiment of this application. As shown in FIG. 4, the image processing method may include S401 to S409.

S401: Extract feature maps of an image on a plurality of scales.

Optionally, the image may be an image captured by a photographing device such as a mobile phone or a camera, or may be an image obtained by a scanner through scanning, or may be a frame of image or a screenshot of an image in some videos.

In a neural network that implements the image processing method, a part configured to extract the feature map of the image on the plurality of scales may be a deep residual network (Resnet), a VGG network, an AlexNet network, a GoogLeNet network, or the like. This is not limited in this application.

The Resnet is used as an example. The Resnet may perform feature extraction on an input image, and output feature maps of the image on a plurality of scales, and a feature map on each scale includes features of a plurality of texture primitives of the image on the scale.

S402: Scale the feature maps of the image on the plurality of scales to a same scale size for splicing, to obtain a multi-scale feature map of the image.

The multi-scale feature map includes features of a plurality of texture primitives of the image on a plurality of different scales.

For example, the Resnet is Resnet 50. It is assumed that outputs of a third residual module (Res3), a fourth residual module (Res4), and a fifth residual module (Res5) of Resnet 50 are respectively a feature map 3, a feature map 4, and a feature map 5 in sequence. The feature map 3, the feature map 4, and the feature map 5 are feature maps of the image on three different scales. A size of the feature map 3 may be used as a reference, and matrices corresponding to the feature map 4 and the feature map 5 may be scaled to have a same scale size as the feature map 3 but have a different channel quantity from the feature map 3. For example, a scaling manner may be interpolation scaling. After scaling is completed, the feature map 3, the feature map 4, and the feature map 5 may be spliced along a channel dimension, to obtain the multi-scale feature map of the image.

However, it should be noted that, in another embodiment of this application, when the feature maps of the image on the plurality of scales are extracted by using another network such as a VGG network, an AlexNet network, or a GoogLeNet network, feature maps output by different network layers in these networks may also be spliced, to obtain the multi-scale feature map. A basic principle thereof is similar to the example description, and details are not described herein again.

In an aspect, after the multi-scale feature map of the image is obtained, a dependency relationship between features of texture primitives of the image may be obtained based on direction information and the multi-scale feature map of the image.

The direction information may include one or more directions.

For example, in an embodiment, the direction information may include at least one preset directional map, each directional map may be used to indicate one direction, and different directional maps correspond to different directions. For example, the direction information includes eight directional maps. The eight directional maps may sequentially indicate eight directions such as an upward direction, a downward direction, a leftward direction, a rightward direction, an upper leftward direction, a lower leftward direction, an upper rightward direction, and a lower rightward direction. Values of matrices corresponding to the directional maps may be change gradually in a direction corresponding to the directional map, to indicate the direction.

A matrix of a directional map whose corresponding direction is the upward direction may be as follows:

$$\begin{bmatrix} 3 & 3 & 3 \\ 2 & 2 & 2 \\ 1 & 1 & 1 \end{bmatrix}$$

A matrix of a directional map whose corresponding direction is the downward direction may be as follows:

$$\begin{bmatrix} 1 & 1 & 1 \\ 2 & 2 & 2 \\ 3 & 3 & 3 \end{bmatrix}$$

A matrix of a directional map whose corresponding direction is the upper leftward direction may be as follows:

$$\begin{bmatrix} 5 & 4 & 3 \\ 4 & 3 & 2 \\ 3 & 2 & 1 \end{bmatrix}$$

A matrix of a directional map whose corresponding direction is the lower rightward direction may be as follows:

$$\begin{bmatrix} 1 & 2 & 3 \\ 2 & 3 & 4 \\ 3 & 4 & 5 \end{bmatrix}$$

In some embodiments, the direction information may include a first direction and a second direction opposite to the first direction.

For example, a quantity of directional maps included in the direction information may be an even quantity, and for any first directional map in the direction information, the direction information further includes a second directional map whose direction is opposite to a direction corresponding to the first directional map. In other words, the directional maps in the direction information are in pairs. For example, if the direction information includes two directional maps, directions corresponding to the two directional maps may be a pair of the leftward direction and the rightward direction, a pair of the upward direction and the downward direction, a pair of the upper leftward direction and the lower leftward direction, or the like. Similarly, if there are four directional maps, directions may be one or more of the foregoing pairs. When the direction information includes the even quantity of directional maps that exist in pairs, the dependency relationship between the features of the texture primitives of the image may be obtained fully.

Certainly, it can be understood that, in an actual implementation, the direction information may further include more (for example, 16 or 32) directional maps used to indicate different directions, or fewer (for example, 1 or 2) directional maps used to indicate different directions. Alternatively, in some embodiments, the direction information may be implemented in another manner, for example, relative coordinates or absolute coordinates. This is not limited in this application.

For specific steps of obtaining the dependency relationship between the features of the texture primitives of the image based on the direction information and the multi-scale feature map of the image, refer to S403 to S405.

S403: Extract a feature of each texture primitive in the multi-scale feature map of the image based on the direction information, to obtain features of texture primitives in a plurality of regions of the image.

Optionally, the feature of each texture primitive in the multi-scale feature map of the image may be extracted along one or more directions included in the direction information.

An example description of S403 is provided by using the directional map as an example.

The neural network may extract the feature of each texture primitive in the multi-scale feature map of the image based on one or more directional maps along a direction corresponding to the directional map, to obtain a plurality of first matrices.

Each first matrix includes a feature of a texture primitive in a local region in the multi-scale feature map of the image. In a plurality of first matrices obtained based on each directional map, different first matrices correspond to different local regions in the multi-scale feature map of the image.

Optionally, a part that is of the neural network and that is configured to extract the feature of each texture primitive in the multi-scale feature map of the image may be a convolutional network. The convolutional network may perform a plurality of convolution operations on the multi-scale feature map based on the directional map, to obtain a plurality of first matrices.

When the convolutional network may perform the plurality of convolution operations on the multi-scale feature map based on the directional map, a value of the directional map may be first mapped onto a fixed value range by using a linear function or a nonlinear function, for example, [−1, 1], and the convolutional network maps the directional map onto feature space the same as that of the multi-scale feature map. The directional map and the multi-scale feature map are normalized in this manner, and a numerical difference between the directional map and the multi-scale feature map may be reduced, so that the neural network can converge more easily and can capture the feature of the texture primitive more accurately.

For example, it is assumed that a matrix of the multi-scale feature map is a 9*9 (9 rows and 9 columns) matrix, and a convolution kernel of the convolutional network is a 3*3 matrix. Therefore, a matrix of the directional map is also a 3*3 matrix (referring to the example description). The convolutional network may convolve the 9*9 matrix corresponding to the multi-scale feature map along a direction corresponding to the directional map and by using the 3*3 matrix corresponding to the convolutional kernel, one 3*3 matrix may be extracted through each time of convolution, and the matrix is the first matrix.

For example, the direction corresponding to the directional map is the lower rightward direction. A first matrix obtained by the convolutional network through a first time of convolution includes features of texture primitives in a local region that belong to a first row to a third row and a first column to a third column in the 9*9 matrix corresponding to the multi-scale feature map. Similarly, a first matrix obtained by the convolutional network through a second time convolution includes features of texture primitives in a local region that belong to a fourth row to a sixth row and a fourth column to a sixth column in the 9*9 matrix corresponding to the multi-scale feature map.

S404: Obtain a dependency relationship between features of texture primitives in each region based on the features of the texture primitives in the plurality of regions, to obtain a plurality of groups of dependency relationships respectively corresponding to the plurality of regions.

As shown in S403, the neural network may extract the feature of each texture primitive in the multi-scale feature map of the image based on the one or more directional maps along the direction corresponding to the directional map, to obtain the plurality of first matrices, so as to obtain the features of texture primitives in the plurality of regions of the image. Further, the neural network may further obtain, based on the plurality of first matrices, the dependency relationship between the features of the texture primitives in each region, to obtain a plurality of groups of dependency relationships respectively corresponding to the plurality of regions. For example, a second matrix corresponding to each first matrix may be determined, to obtain a plurality of second matrices. The second matrix may include a dependency relationship between features that are of texture primitives in a local region and that are included in the corresponding first matrix.

For example, the first matrix is a matrix A. It is assumed that a size of the matrix A is ($k\_w$, $k\_h$, c), where $k\_w$ represents a quantity of rows of the matrix A, $k\_h$ represents a quantity of columns of the matrix A, and c represents a channel dimension of the matrix A. Two times of different nonlinear transformations may be performed on the matrix A, to obtain matrices that correspond to the matrix A and that are obtained after two nonlinear transformations (for example, a transformation may be performed by using two nonlinear functions), and the matrices are referred to as a matrix B1 and a matrix B2 herein. Sizes of the matrix B1 and the matrix B2 are ($k\_w$, $k\_h$, c).

After the matrix B1 and the matrix B2 are obtained, the matrix B1 may be first reshaped and transposed into a matrix whose size is ($k\_w*k\_h$, 1, c), and the matrix B2 is reshaped into a matrix whose size is (1, $k\_w*k\_h$, c). The matrix obtained by reshaping and transposing the matrix B1 may be referred to as a matrix B1', and a matrix obtained by reshaping the matrix B2 may be referred to as a matrix B2'.

Then, the matrix B1' and the matrix B2' may be multiplied, to obtain a matrix C, and the matrix C is the second matrix that includes the dependency relationship between the features that are of the texture primitives in the local region and that are included in the corresponding first matrix (the matrix A). A size of the matrix C is ($k\_w*k\_h$, $k\_w*k\_h$).

The matrix A is mapped by using the two nonlinear functions, to obtain the matrix B1 and the matrix B2, and different features of texture primitives of the matrix A may be polarized, so that a subsequently established dependency relationship between features of texture primitives is more reliable.

However, it should be noted that the process of obtaining the matrix C based on the matrix A is merely an example description of a process of determining the second matrix based on the first matrix. For example, in another embodiment, the matrix A may also be directly multiplied by the matrix A, to obtain the matrix C. This is not limited herein.

S405: Determine the dependency relationship between the features of the texture primitives of the image based on the plurality of groups of dependency relationships.

As described above, after the plurality of groups of dependency relationships respectively corresponding to the plurality of regions are obtained in S404, the plurality of groups of dependency relationships may be aggregated together by using S405 to serve as the dependency relationship between the features of the texture primitives of the image.

The first matrix and the second matrix are used as an example. The neural network may determine, based on each first matrix and the second matrix corresponding to the first matrix, a feature vector corresponding to a feature that is of a texture primitive in a local region and that is included in each first matrix, to obtain a plurality of feature vectors, and aggregate the plurality of feature vectors, to serve as the dependency relationship between the features of the texture primitives of the image. The feature vector is used to indicate the dependency relationship between the features that are of the texture primitives in the local region and that are included in the first matrix.

Optionally, before the determining the dependency relationship between the features of the texture primitives of the image based on the plurality of groups of dependency relationships, the neural network may further update a bidirectional relationship value between features of any two texture primitives in each of the plurality of groups of dependency relationships based on a first function.

In other words, before determining, based on each first matrix and the second matrix corresponding to the first matrix, the feature vector corresponding to the feature that is of the texture primitive in the local region and that is included in each first matrix, the neural network may update the dependency relationship included in the second matrix.

In addition, that the first matrix is the matrix A and the second matrix is the matrix C is used as an example for description.

After obtaining the matrix C, the neural network may perform a bidirectional cooperative operation on the matrix C based on the first function, to obtain a matrix D. A size of the matrix D is the same as the size of the matrix C.

In some embodiments, a bidirectional cooperative policy (namely, the first function) for performing the bidirectional cooperative operation on the matrix C may be as follows:

$$r_{\overline{ij}} = \exp(r_{ij})/(\exp(r_{ij}) \cdot \exp(r_{ji}))$$

$$r_{\overline{ji}} = \exp(r_{ji})/(\exp(r_{ij}) \cdot \exp(r_{ji}))$$

Herein, $r_{ij}$ and $r_{ji}$ represent a bidirectional relationship value between a texture primitive i and a texture primitive j in the matrix C, and $r_{\overline{ij}}$ and $r_{\overline{ji}}$ represent a bidirectional relationship value between the texture primitive i and the texture primitive j in the matrix D (obtained after the bidirectional cooperative operation is performed on the matrix C).

Performing the bidirectional cooperative operation on the matrix C is to calculate a weight proportion between the texture primitive i and the texture primitive j based on the bidirectional cooperative policy, to obtain a new matrix D. When the weight proportion is calculated, a reweighting function such as softmax or logit may be used. A function type is not limited in this application.

Compared with the matrix C, in the matrix D obtained by performing the bidirectional cooperative operation on the matrix C, the dependency relationship between the features that are of the texture primitives in the local region and that are included in the first matrix may be enhanced.

After the matrix D is obtained, the matrix A corresponding to the matrix D (because the matrix A corresponds to the matrix C and the matrix D is obtained based on the matrix C, the matrix A corresponds to the matrix D) may be reshaped into a matrix whose size is (1, k_w*k_h, c). For example, the matrix is referred to as a matrix A'. Then, the matrix A' and the matrix D may be multiplied, and a result matrix obtained after multiplication is reshaped, to obtain a matrix E. A size of the matrix E is (k_w, k_h, c). It can be understood that a corresponding matrix E of each matrix A (the first matrix) is obtained based on the series of matrix operations.

After the matrix E is obtained, the matrix E may be pooled, to obtain a feature vector at a central location of the matrix E, to be specific, a feature vector that corresponds to a feature of each texture primitive in the local region and that is included in the matrix A (the first matrix). A size of the feature vector is (1, 1, c).

Optionally, pooling the matrix E may include average pooling, maximum pooling, and the like. This is not limited herein.

It may be determined, based on the process of obtaining the feature vector based on the matrix A, that a feature vector corresponding to each first matrix is obtained, to obtain a plurality of feature vectors.

The plurality of feature vectors are aggregated, to obtain the dependency relationship between the features of the texture primitives of the image.

For example, after the plurality of feature vectors are obtained, a fourth matrix may be formed based on the plurality of feature vectors. For example, the fourth matrix may be referred to as a matrix F. A size of the matrix F is (ww, hh, c), ww represents a length of the multi-scale feature map, and hh represents a width of the multi-scale feature map. The fourth matrix may be used to indicate the dependency relationship between the features of the texture primitives.

In another aspect, in addition to one manner of performing S403 to S405 described in the foregoing aspect, there may be another manner of obtaining at least one group of texture features of the image based on a feature map of the image on at least one scale. For example, S406 and S407 may be performed.

S406: Extract a feature of each texture primitive in the feature map of the image on the at least one scale, to obtain the features of the plurality of texture primitives.

S407: Pool the features of the plurality of texture primitives, to obtain the at least one group of texture features.

Optionally, a part that is in the neural network in this application and that is configured to extract the feature of each texture primitive in the feature map of the image on the at least one scale may also be implemented by using a convolutional network. A basic principle thereof is similar to the principle of extracting the feature of each texture primitive in the multi-scale feature map of the image. Details are not described herein again.

In an embodiment, the extracting a feature of each texture primitive in the feature map of the image on the at least one scale in S406 may be: performing feature extraction on one or more of the feature maps that are of the image on the plurality of scales and that are obtained in S401, to obtain a texture feature of the one or more feature maps. Correspondingly, the texture feature of the one or more feature maps is pooled in S407.

In another embodiment, the extracting a feature of each texture primitive in the feature map of the image on the at least one scale in S406 may alternatively be: performing feature extraction on the multi-scale feature map obtained in S402, to obtain a texture feature of the multi-scale feature map. Correspondingly, the texture feature of the multi-scale feature map is pooled in S407.

In this application, a specific implementation of S406 and S407 is not limited.

After the dependency relationship between the features of the texture primitives of the image and the at least one group of texture features of the image are obtained in the two aspects, the dependency relationship between the features of the texture primitives of the image and the at least one group of texture features of the image may be aggregated, to obtain a texture representation result of the image. For example, S408 may be performed.

S408: Obtain the texture representation result of the image based on the dependency relationship and the at least one group of texture features.

It is assumed that the dependency relationship between the features of the texture primitives of the image is that the fourth matrix (the matrix F) in S405 and at least one group of texture features form a fifth matrix.

In some embodiments, the obtaining the texture representation result of the image based on the dependency relationship and the at least one group of texture features may be: adding the fourth matrix and the fifth matrix, so as to aggregate the dependency relationship between the features of the texture primitives of the image and the texture feature of the image, to obtain a sum of the fourth matrix and the fifth matrix, namely, the texture representation result of the image.

In some other embodiments, the fourth matrix and the fifth matrix may alternatively be multiplied, or another more complex matrix operation may be performed, to aggregate the dependency relationship between the features of the texture primitives of the image and the texture feature of the image, so as to obtain the texture representation result of the image. This is not limited herein in this application.

The image may be processed based on the texture representation result that is of the image and that is obtained in S408. For example, S409 may be performed.

S409: Process the image based on the texture representation result of the image.

Optionally, the processing the image may be: recognizing the image, segmenting the image, performing image synthesis based on the image, or the like. Based on different image processing requirements, the image processing method provided in this embodiment of this application may be applied to any scenario in which the image needs to be processed based on the texture representation result of the image.

Based on the foregoing descriptions, in this embodiment of this application, the texture representation result of the image may be obtained based on the dependency relationship between the features of the texture primitives of the image and the at least one group of texture features of the image, so that the texture representation result of the image may include both the texture feature of the image and a dependency relationship between features of different texture primitives of the image, and the texture representation result of the image can reflect more perfect texture information of the image, to improve an image processing effect achieved when image processing such as image recognition, image segmentation, or image synthesis is subsequently performed based on the texture representation result of the image. For example, accuracy of performing image recognition based on the texture representation result of the image may be effectively improved.

In addition, in this embodiment of this application, when the neural network extracts the feature of each texture primitive in the multi-scale feature map of the image along the direction corresponding to the directional map, the at least one directional map is used as a spatial context guidance condition, so that a capability of extracting a spatial context cue can be effectively improved, to better sense the feature of the texture primitive, and extract as many features of potential texture primitives in the multi-scale feature map as possible.

Further, in this embodiment of this application, before the dependency relationship between the features of the texture primitives of the image is determined based on the plurality of groups of dependency relationships, the neural network updates the bidirectional relationship value between the features of the any two texture primitives in each of the plurality of groups of dependency relationships based on the first function, to strengthen each group of dependency relationships, and establish a correlation between the features of the any two texture primitives, so that the neural network learns of spatial structure dependency between the texture primitives more easily.

In some embodiments, before an original image is processed based on the process of S401 to S409, the original image may be first preprocessed, to obtain a preprocessed image. Then, the preprocessed image may be processed based on the process of S401 to S409. In other words, the image processing method may further include a step of preprocessing the image. For example, FIG. 5A and FIG. 5B are another schematic flowchart of an image processing method according to an embodiment of this application.

Figure 5A:
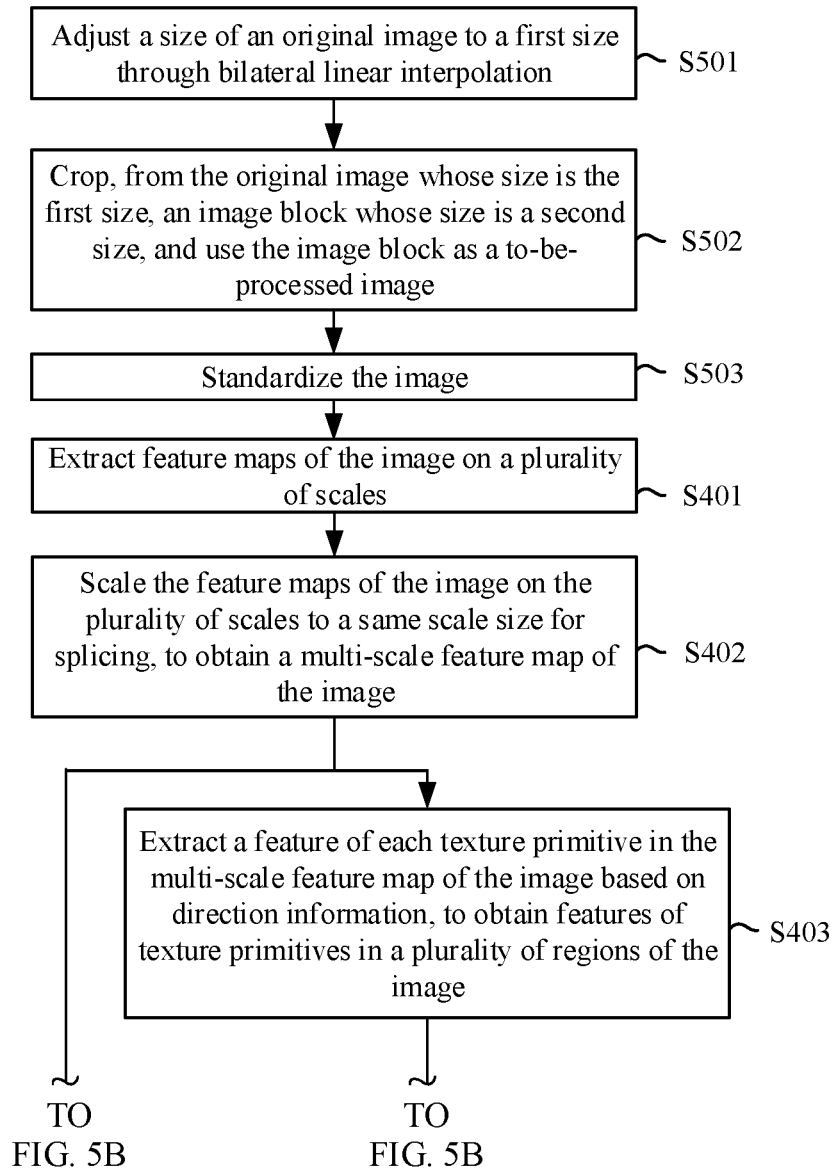
FIG. 5A and FIG. 5B are another schematic flowchart of an image processing method according to an embodiment of this application.
Figure 5B:
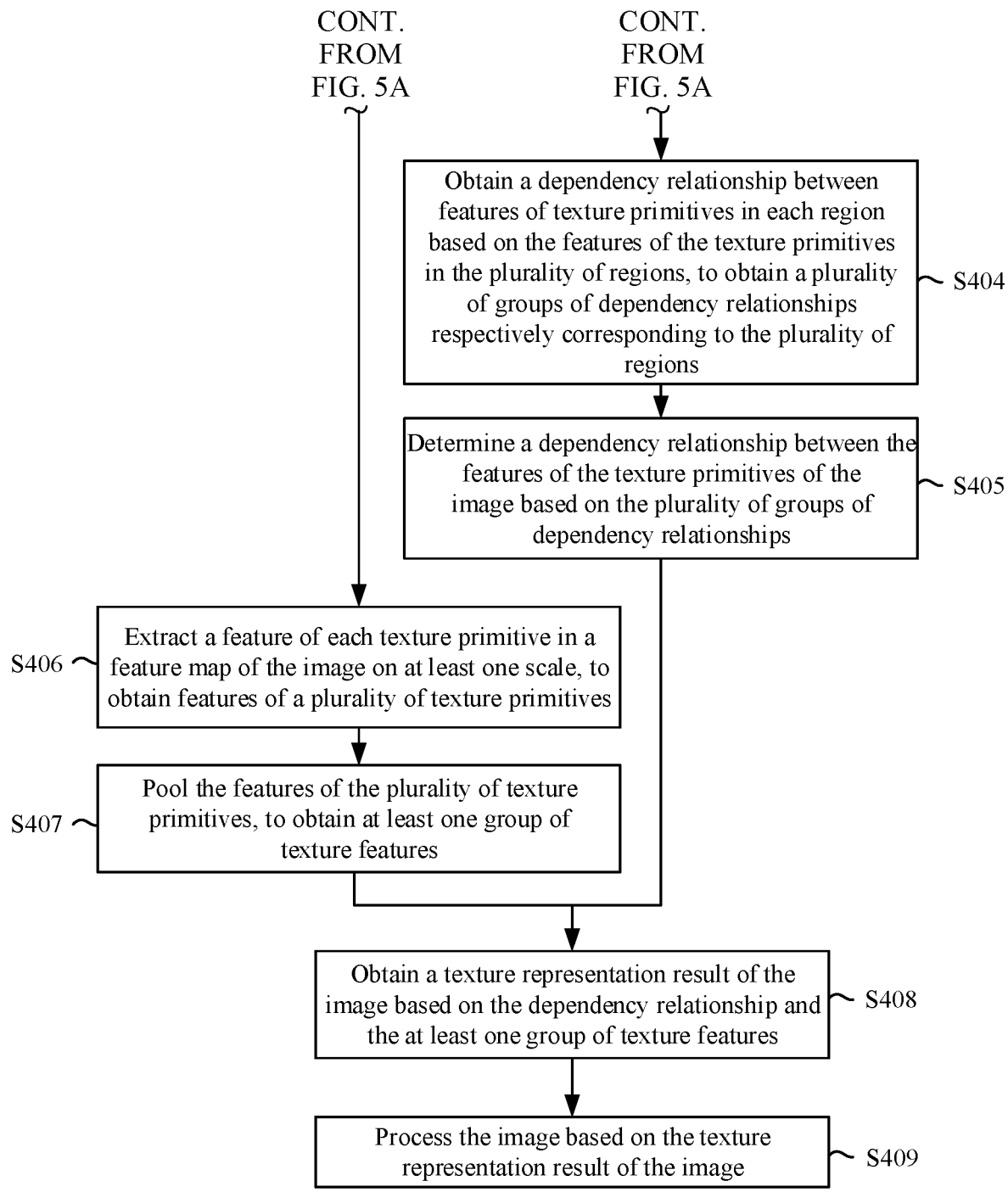

As shown in FIG. 5A and FIG. 5B, before S401 in FIG. 4, the image processing method may further include S501 to S503.

S501: Adjust a size of the original image to a first size through bilateral linear interpolation.

For example, the first size may be 512*512, and the size of the original image may be adjusted to 512*512 through bilateral linear interpolation. Certainly, a specific value of the first size may alternatively be another value, for example, 256*256. This is not limited in this application.

S502: Crop, from the original image whose size is the first size, an image block whose size is a second size, and use the image block as a to-be-processed image.

For example, the second size may be 224*224. After the size of the original image is adjusted to 512*512, the original image whose size is 512*512 may be cropped, to obtain an image block whose size is 224*224, and use the image block as a subsequent to-be-processed image. A cropping manner may be performing random cropping, or may be performing cropping by using, as a center, a central location of the original image whose size is 512*512. This is not limited herein in this application.

S503: Standardize the image.

For example, z-score standardization may be performed on the image block obtained in S502, to centralize feature data of each texture primitive of the image block. The image is standardized, to increase a generalization capability of image processing.

It can be understood that, in some embodiments, a plurality of image blocks whose sizes are the second size may be cropped from the original image whose size is the first size. Each image block may be processed based on the process of S401 to S409. In addition, in a processing process, for each image block used as an image, a plurality of multi-scale feature maps corresponding to the image block may be obtained, to form a multi-scale feature pool. For each multi-scale feature map, the dependency relationship between the features that are of the texture primitives and that are included in the multi-scale feature map may be extracted based on the operations in S403 to S405. A dependency relationship between the features that are of the texture primitives and that are included in each of the plurality of multi-scale feature maps may form a dependency relationship between features of each texture primitive of the image block.

The following further describes this embodiment of this application by using image recognition as an example.

In the image processing method shown in FIG. 4 or FIG. 5A and FIG. 5B, S409 may specifically be: The neural network determines a prediction classification label of the image based on the texture representation result of the image. The prediction classification label of the image is a recognition result of the image.

For example, if the original image is a photo of a user M, an output prediction classification label may be any one or more of an occupation, a gender, a name, and the like of the user M. A specific type of the prediction classification label is related to an actual classification label in a training sample during training, in other words, is related to a specific recognition function of the neural network for image recognition.

Figure 6:
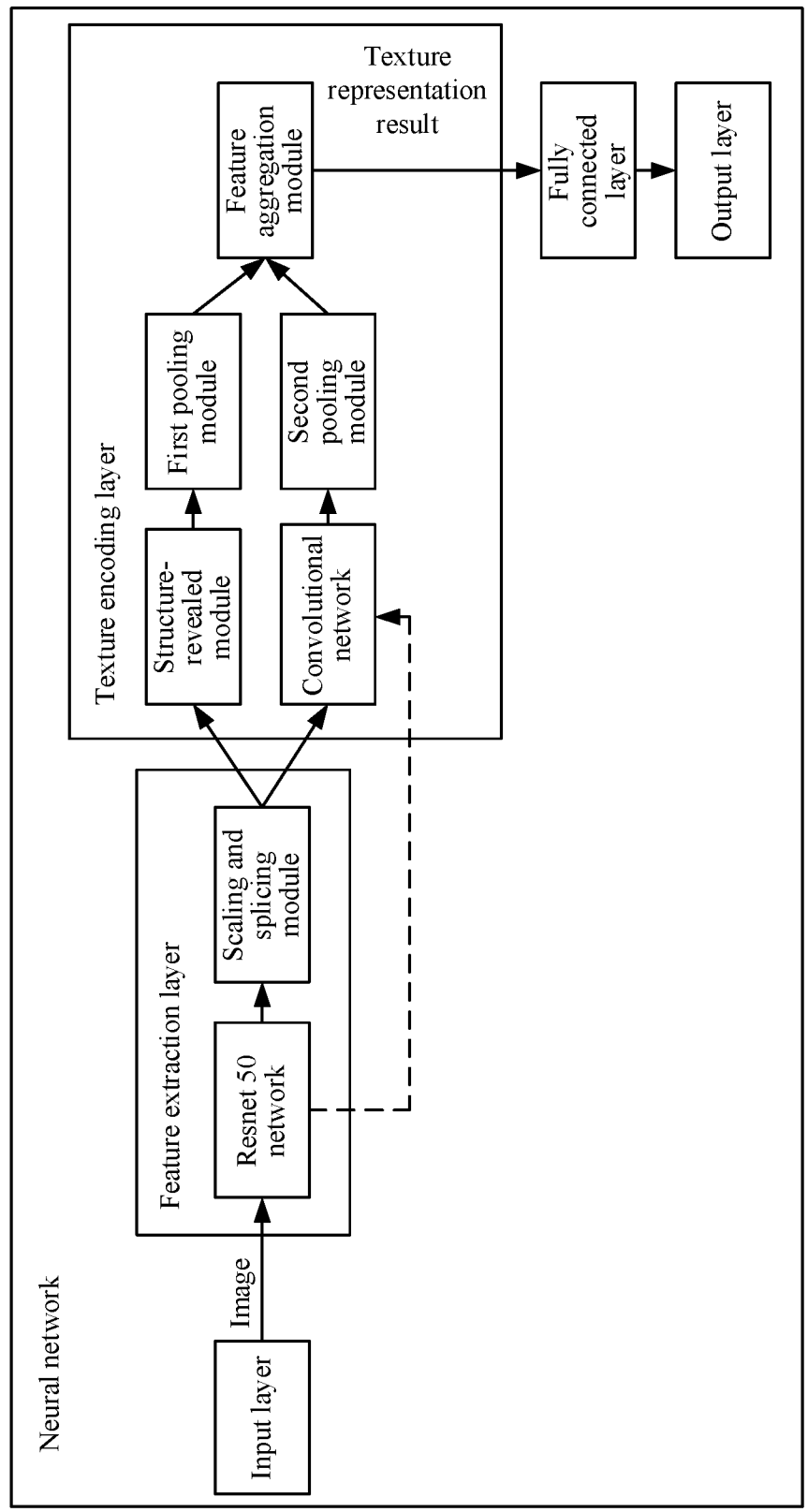
FIG. 6 is a schematic diagram of a composition of a neural network according to an embodiment of this application.

FIG. 6 is a schematic diagram of a composition of a neural network according to an embodiment of this application. As shown in FIG. 6, in an embodiment, when an image processing method is applied to image recognition, the neural network provided in this embodiment of this application may include an input layer, a feature extraction layer, a texture encoding layer, a fully connected layer, and an output layer.

The input layer may be configured to input an original image or an image obtained after an original image is preprocessed.

The feature extraction layer may include a Resnet 50 network and a scaling and splicing module. The Resnet 50 network can perform feature extraction on the image, and output feature maps of the image on a plurality of scales (for example, implement a function in S401). The scaling and splicing module can scale the feature maps of the image on the plurality of scales to a same scale size for splicing, to obtain a multi-scale feature map of the image (for example, a function in S402).

The texture encoding layer may include a structure-revealed module, a first pooling module, a convolutional network, a second pooling module, and a feature aggregation module. The structure-revealed module may use a directional map as a spatial context guidance condition, and obtain a dependency relationship between features of texture primitives of the image based on the multi-scale feature map output by the feature extraction layer (for example, implement a function in S403 to S405). The first pooling module may pool an output result of the structure-revealed module. The convolutional network may extract a global texture feature of the image based on the multi-scale feature map output by the feature extraction layer or a feature map on at least one scale (for example, a function in S406). The second pooling module may pool the global texture feature that is of the image and that is output by the convolutional network (for example, implement a function in S407). The feature aggregation module may aggregate the texture feature of the image and the dependency relationship between the features of the texture primitives of the image, to obtain a texture representation result of the image (for example, implement a function in S408).

The fully connected layer may recognize the image based on the texture representation result that is of the image and that is output by the texture encoding layer, and output a prediction classification label of the image. The prediction classification label is a recognition result of the image (which is similar to the fully connected layer shown in FIG. 2, where details are not described herein again).

As described in the foregoing embodiment, the image processing method in this embodiment of this application may be implemented by using program code in a memory, and may be applied to or inferred on a high-performance computing device such as a CPU or a GPU. The following briefly describes a training process and an inference process of the neural network by using image recognition as an example.

(1) The training process of the neural network may be as follows: First, an architecture of the neural network shown in FIG. 6 may be constructed, and a weight parameter of the entire neural network may be initialized. Then, forward inference calculation may be performed on the device such as the GPU or the CPU based on a current network weight, and an error value may be calculated based on a forward inference calculation result and a true value. Whether the neural network meets a convergence requirement may be determined based on the error value. If the error value does not meet the convergence requirement, all trainable weights in the neural network are updated by performing back propagation based on the error value. Then, the foregoing steps may be cycled until the error value meets the convergence requirement. When the error value meets the convergence requirement, all parameters in the neural network may be fixed and is no longer updated, and is stored.

(2) The inference process of the neural network may be: storing the neural network trained in (1) in another computing device such as the GPU or the CPU. Then, an image that needs to be recognized may be input into the neural network, and forward inference calculation is performed based on the current network weight. An output of the neural network is the recognition result of the image.

Optionally, when the image processing method is applied to other image processing, for example, image separation or image synthesis, the texture encoding layer shown in FIG. 6 may also be embedded into another neural network to implement a corresponding function. The texture encoding layer has robustness regardless of a neural network to which the texture encoding layer is applied. Examples are not given one by one herein for description.

The foregoing mainly describes the solution provided in this embodiment of this application from a perspective of the neural network or an image processing device. It can be understood that, to implement the function, the neural network or the image processing device may include a corresponding hardware structure and/or a software module for executing each function.

Figure 7:
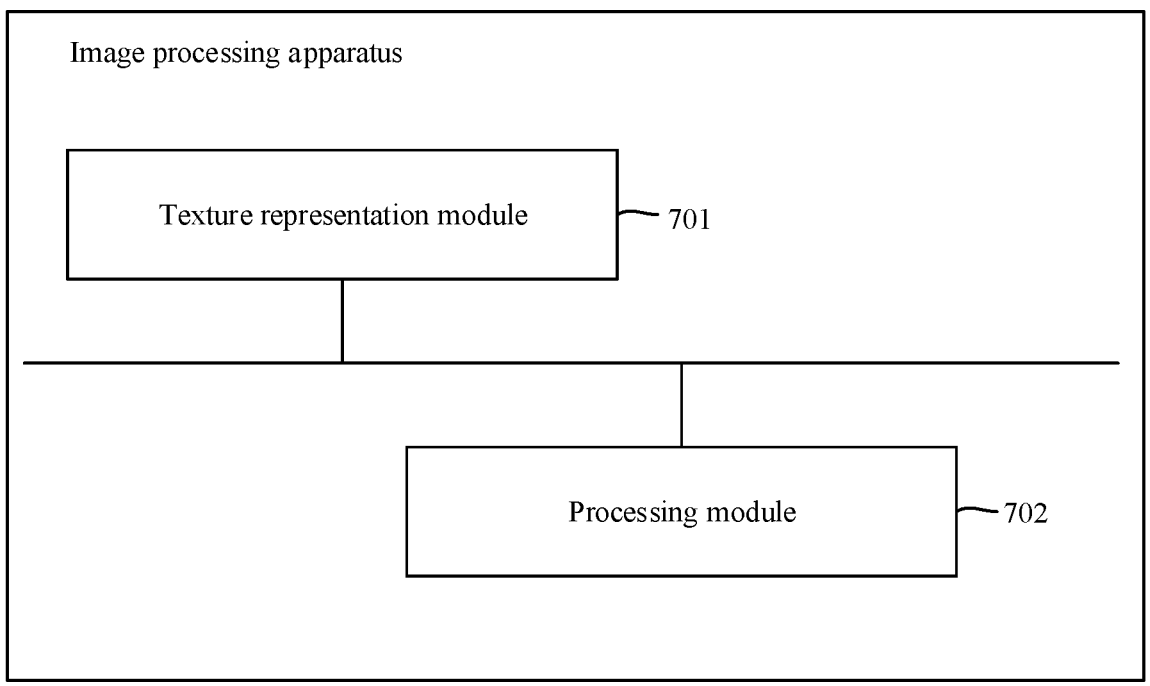
FIG. 7 is a schematic diagram of a structure of an image processing apparatus according to an embodiment of this application.

For example, an embodiment of this application may further provide an image processing apparatus. FIG. 7 is a schematic diagram of a structure of an image processing apparatus according to an embodiment of this application. As shown in FIG. 7, the image processing apparatus may include a texture representation module 701 and a processing module 702. The texture representation module 701 may be configured to: obtain a dependency relationship between features of texture primitives of an image based on direction information and a multi-scale feature map of the image, where the multi-scale feature map includes features of a plurality of texture primitives of the image on a plurality of different scales, and the direction information includes one or more directions; obtain at least one group of texture features of the image based on a feature map of the image on at least one scale, where the group of texture features of the image is obtained based on the feature map on one scale; and obtain a texture representation result of the image based on the dependency relationship and the at least one group of texture features. The processing module 702 may be configured to process the image based on the texture representation result of the image.

In an embodiment, the direction information may include a first direction and a second direction opposite to the first direction.

Optionally, the texture representation module may be specifically configured to: extract a feature of each texture primitive in the feature map of the image on the at least one scale, to obtain the features of the plurality of texture primitives; and pool the features of the plurality of texture primitives, to obtain the at least one group of texture features.

Optionally, the texture representation module is further specifically configured to: extract a feature of each texture primitive in the multi-scale feature map of the image based on the direction information, to obtain features of texture primitives in a plurality of regions of the image; obtain a dependency relationship between features of texture primitives in each region based on the features of the texture primitives in the plurality of regions, to obtain a plurality of groups of dependency relationships respectively corresponding to the plurality of regions; and determine the dependency relationship between the features of the texture primitives of the image based on the plurality of groups of dependency relationships.

Optionally, the texture representation module is specifically configured to extract the feature of each texture primitive in the multi-scale feature map of the image along the one or more directions.

In an embodiment, the texture representation module may be further configured to update a bidirectional relationship value between features of any two texture primitives in each of the plurality of groups of dependency relationships based on a first function.

It should be understood that division into modules or units in the apparatus is merely logical function division. In an actual implementation, all or some modules or units may be integrated into one physical entity, or may be physically separated. In addition, the modules in the apparatus may be all implemented in a form of invoking software by a processing element, or may be all implemented in a form of hardware; or some units may be implemented in a form of invoking software by a processing element, or some units are implemented in a form of hardware.

For example, each unit may be an independently disposed processing element, or may be integrated into a chip of the apparatus for implementation. In addition, each unit may be stored in a memory in a form of a program, and a function of the unit is invoked and executed by a processing element of the apparatus. In addition, all or some of these units may be integrated together, or may be implemented independently. The processing element herein may also be referred to as a processor, and may be an integrated circuit with a signal processing capability. In an embodiment process, steps of the method or the units may be implemented by using an integrated logic circuit of hardware in a processor element or in a form of invoking software by a processing element.

In an example, a unit of any one of the apparatuses may be one or more integrated circuits configured to implement the method, for example, one or more application-specific integrated circuits (ASIC), or one or more microprocessors (or referred as digital signal processor, DSP), or one or more field programmable gate arrays (FPGA), or a combination of at least two of these integrated circuit forms.

For another example, when a unit in the apparatus is implemented in a form of scheduling a program by the processing element, the processing element may be a general-purpose processor, for example, a central processing unit (CPU) or another processor that may invoke the program. For another example, the units may be integrated together and implemented in a form of a system-on-a-chip (SOC).

For example, an embodiment of this application may further provide an image processing apparatus. The apparatus may include: an interface circuit, configured to receive data of a to-be-processed image; and a processor, connected to the interface circuit and configured to perform steps in the method. There are one or more processors.

In an embodiment, the modules that respectively implement corresponding steps in the methods may be implemented in a form of scheduling a program by a processing element. For example, the image processing apparatus may include a processing element and a storage element, and the processing element invokes a program stored in the storage element, to perform the method in the method embodiment. The storage element may be a storage element on a same chip as the processing element, namely, an on-chip storage element.

In another embodiment, a program for implementing the method may be located on a storage element on a chip different from that of the processing element, namely, an off-chip storage element. In addition, the processing element invokes or loads the program on the on-chip storage element from the off-chip storage element, to invoke and execute the method in the method embodiment.

For example, an embodiment of this application may further provide an image processing apparatus, and may include a processor. The processor is configured to: be connected to a memory, and invoke a program stored in the memory, to perform the method in the method embodiment. The memory may be located inside the image processing apparatus, or may be located outside the image processing apparatus. There are one or more processors.

In still another embodiment, a module for implementing steps in the method may be configured as one or more processing elements, and the processing element may be disposed on a terminal. The processing element may be an integrated circuit, for example, one or more ASICs, or one or more DSPs, or one or more FPGAs, or a combination of these integrated circuits. The integrated circuits may be integrated together to form a chip.

In yet another embodiment, modules for implementing steps in the method may be integrated together, and are implemented in a form of an SOC. The SOC chip is configured to implement a corresponding method. At least one processing element and storage element may be integrated into the chip, and the processing element invokes a program stored in the storage element to implement the foregoing method performed by the network device. Alternatively, at least one integrated circuit may be integrated into the chip, to implement the foregoing method performed by the network device. Alternatively, with reference to the foregoing implementations, functions of some units may be implemented by invoking a program by the processing element, and functions of some units may be implemented by the integrated circuit.

As described above, the processing element herein may be a general-purpose processor, for example, a CPU, or may be one or more integrated circuits, for example, one or more ASICs, one or more microprocessors DSPs, one or more FPGAs, or a combination of at least two of these types of integrated circuits, configured to implement the foregoing method.

The storage element may be one memory, or may be a general term of a plurality of storage elements.

Based on the foregoing descriptions of the embodiments, a person skilled in the art may clearly understand that for the purpose of convenient and brief descriptions, division into the foregoing functional modules is merely used as an example for descriptions. During actual application, the foregoing functions can be allocated to different functional modules for implementation based on a requirement, in other words, an inner structure of an apparatus is divided into different functional modules to implement all or a part of the functions described above.

In the several embodiments provided in this application, it should be understood that the disclosed apparatuses and methods may be implemented in other manners. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, that is, may be located in one place, or may be distributed in a plurality of different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions in embodiments of this application essentially, or the part contributing to the conventional technology, or all or a part of the technical solutions may be implemented in a form of a software product, for example, a program. The software product is stored in a program product, for example, a computer-readable storage medium, and includes several instructions for instructing a device (which may be a single chip microcomputer, a chip, or the like) or a processor to perform all or some of the steps in the method in the embodiments of this application. The foregoing storage medium includes any medium that can store program code, such as a USB flash drive, a removable hard disk, a ROM, a RAM, a magnetic disk, or an optical disc.

For example, an embodiment of this application may further provide a computer-readable storage medium, including computer software instructions. When the computer software instructions run in an image processing apparatus or a chip built into the image processing apparatus, the image processing apparatus may be enabled to perform the method in the method embodiments.

The foregoing descriptions are only specific embodiments of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An image processing method, wherein the method is implemented using a neural network, and the method comprises:
    obtaining a dependency relationship between features of texture primitives of an image based on direction information and a multi-scale feature map of the image, wherein the multi-scale feature map comprises features of a plurality of texture primitives of the image on a plurality of different scales, and the direction information comprises one or more directions;
    obtaining at least one group of texture features of the image based on a feature map of the image on at least one scale of the plurality of different scales, wherein the at least one group of texture features of the image is obtained based on the feature map of the image on the at least one scale;
    obtaining a texture representation result of the image based on the dependency relationship and the at least one group of texture features; and
    processing the image based on the texture representation result of the image.

2. The method according to claim 1, wherein the direction information comprises a first direction and a second direction opposite to the first direction.

3. The method according to claim 1, wherein the obtaining at least one group of texture features of the image based on a feature map of the image on at least one scale of the plurality of different scales comprises:
    extracting a feature of each texture primitive in the feature map of the image on the at least one scale, to obtain the features of the plurality of texture primitives; and
    pooling the features of the plurality of texture primitives, to obtain the at least one group of texture features.

4. The method according to claim 1, wherein the obtaining a dependency relationship between features of texture primitives of an image based on direction information and a multi-scale feature map of the image comprises:
    extracting a feature of each texture primitive in the multi-scale feature map of the image based on the direction information, to obtain features of texture primitives in a plurality of regions of the image;
    obtaining a dependency relationship between features of texture primitives in each region of the plurality of regions based on the features of the texture primitives in the plurality of regions, to obtain a plurality of groups of dependency relationships respectively corresponding to the plurality of regions; and
    determining the dependency relationship between the features of the texture primitives of the image based on the plurality of groups of dependency relationships.

5. The method according to claim 4, wherein before the determining the dependency relationship between the features of the texture primitives of the image based on the plurality of groups of dependency relationships, the method further comprises:
    updating a bidirectional relationship value between features of any two texture primitives in each of the plurality of groups of dependency relationships based on a first function.

6. The method according to claim 4, wherein the extracting a feature of each texture primitive in the multi-scale feature map of the image based on the direction information comprises:
    extracting the feature of each texture primitive in the multi-scale feature map of the image along the one or more directions.

7. The method according to claim 1, wherein the processing the image comprises any one of recognizing the image, segmenting the image, and performing image synthesis based on the image.

8. An apparatus, wherein the apparatus is implemented using a neural network executing in a processor, and the apparatus comprises:
    the processor, wherein the processor is configured to: obtain a dependency relationship between features of texture primitives of an image based on direction information and a multi-scale feature map of the image, wherein the multi-scale feature map comprises features of a plurality of texture primitives of the image on a plurality of different scales, and the direction information comprises one or more directions; obtain at least one group of texture features of the image based on a feature map of the image on at least one scale of the plurality of different scales, wherein the at least one group of texture features of the image is obtained based on the feature map of the image on the at least one scale; and obtain a texture representation result of the image based on the dependency relationship and the at least one group of texture features; and wherein the processor is further configured to process the image based on the texture representation result of the image.

9. The apparatus according to claim 8, wherein the direction information comprises a first direction and a second direction opposite to the first direction.

10. The apparatus according to claim 8, wherein the processor is configured to: extract a feature of each texture primitive in the feature map of the image on the at least one scale, to obtain the features of the plurality of texture primitives; and pool the features of the plurality of texture primitives, to obtain the at least one group of texture features.

11. The apparatus according to claim 8, wherein the processor is configured to: extract a feature of each texture primitive in the multi-scale feature map of the image based on the direction information, to obtain features of texture primitives in a plurality of regions of the image; obtain a dependency relationship between features of texture primitives in each region of the plurality of regions based on the features of the texture primitives in the plurality of regions, to obtain a plurality of groups of dependency relationships respectively corresponding to the plurality of regions; and determine the dependency relationship between the features of the texture primitives of the image based on the plurality of groups of dependency relationships.

12. The apparatus according to claim 11, wherein the processor is further configured to update a bidirectional relationship value between features of any two texture primitives in each of the plurality of groups of dependency relationships based on a first function.

13. The apparatus according to claim 11, wherein the processor is configured to extract the feature of each texture primitive in the multi-scale feature map of the image along the one or more directions.

14. The apparatus according to claim 8, wherein the processor is configured to perform any one of the following steps: recognizing the image, segmenting the image, and performing image synthesis based on the image.

15. An image processing apparatus, comprising:
an interface circuit, configured to receive data of a to-be-processed image; and
a processor, connected to the interface circuit, and configured to perform the following method:
obtaining a dependency relationship between features of texture primitives of an image based on direction information and a multi-scale feature map of the image, wherein the multi-scale feature map comprises features of a plurality of texture primitives of the image on a plurality of different scales, and the direction information comprises one or more directions;
obtaining at least one group of texture features of the image based on a feature map of the image on at least one scale of the plurality of different scales, wherein the at least one group of texture features of the image is obtained based on the feature map of the image on the at least one scale;
obtaining a texture representation result of the image based on the dependency relationship and the at least one group of texture features; and
processing the image based on the texture representation result of the image.

16. The image processing apparatus according to claim 15, wherein the direction information comprises a first direction and a second direction opposite to the first direction.

17. The image processing apparatus according to claim 15, wherein the obtaining at least one group of texture features of the image based on a feature map of the image on at least one scale of the plurality of different scales comprises:
extracting a feature of each texture primitive in the feature map of the image on the at least one scale, to obtain the features of the plurality of texture primitives; and
pooling the features of the plurality of texture primitives, to obtain the at least one group of texture features.

18. The image processing apparatus according to claim 15, wherein the obtaining a dependency relationship between features of texture primitives of an image based on direction information and a multi-scale feature map of the image comprises:
extracting a feature of each texture primitive in the multi-scale feature map of the image based on the direction information, to obtain features of texture primitives in a plurality of regions of the image;
obtaining a dependency relationship between features of texture primitives in each region of the plurality of regions based on the features of the texture primitives in the plurality of regions, to obtain a plurality of groups of dependency relationships respectively corresponding to the plurality of regions; and
determining the dependency relationship between the features of the texture primitives of the image based on the plurality of groups of dependency relationships.

19. The image processing apparatus according to claim 18, wherein before the determining the dependency relationship between the features of the texture primitives of the image based on the plurality of groups of dependency relationships, the method further comprises:
updating a bidirectional relationship value between features of any two texture primitives in each of the plurality of groups of dependency relationships based on a first function.

20. The image processing apparatus according to claim 18, wherein the extracting a feature of each texture primitive in the multi-scale feature map of the image based on the direction information comprises:
extracting the feature of each texture primitive in the multi-scale feature map of the image along the one or more directions.

* * * * *